United States Patent [19]
Tomita

[11] Patent Number: 6,068,014
[45] Date of Patent: May 30, 2000

[54] PRESSURE-REDUCING VALVE

[75] Inventor: Taku Tomita, Tokyo, Japan

[73] Assignee: SMC Kabushiki Kaisha, Tokyo, Japan

[21] Appl. No.: 09/039,398

[22] Filed: Mar. 16, 1998

[30] Foreign Application Priority Data

Mar. 26, 1997 [JP] Japan .................................. 9-074040

[51] Int. Cl.[7] .................................................. G05D 16/02
[52] U.S. Cl. .......................................... 137/116.5; 137/508
[58] Field of Search ............................... 137/116.5, 505, 137/505.11, 508

[56] References Cited

U.S. PATENT DOCUMENTS

| | | | |
|---|---|---|---|
| 1,595,809 | 8/1926 | Nichols | 137/116.5 |
| 2,706,995 | 4/1955 | May | 137/116.5 |
| 2,739,611 | 3/1956 | Cornelius | 137/116.5 X |
| 3,990,470 | 11/1976 | Malec | 137/116.5 |

FOREIGN PATENT DOCUMENTS

| | | |
|---|---|---|
| 837052 | 6/1960 | United Kingdom . |
| 1 205 698 | 9/1970 | United Kingdom . |

*Primary Examiner*—Stephen M. Hepperle
*Attorney, Agent, or Firm*—Oblon, Spivak, McClelland, Maier & Neustadt, P.C.

[57] ABSTRACT

A pressure-reducing valve has a relief valve seat shaped as a bottomed cylindrical sleeve, a seat disposed on an inner wall surface of the relief valve seat, and a relief valve mechanism having a ball for opening and closing a relief passage defined in the relief valve seat when unseated off and seated on the seat.

15 Claims, 5 Drawing Sheets

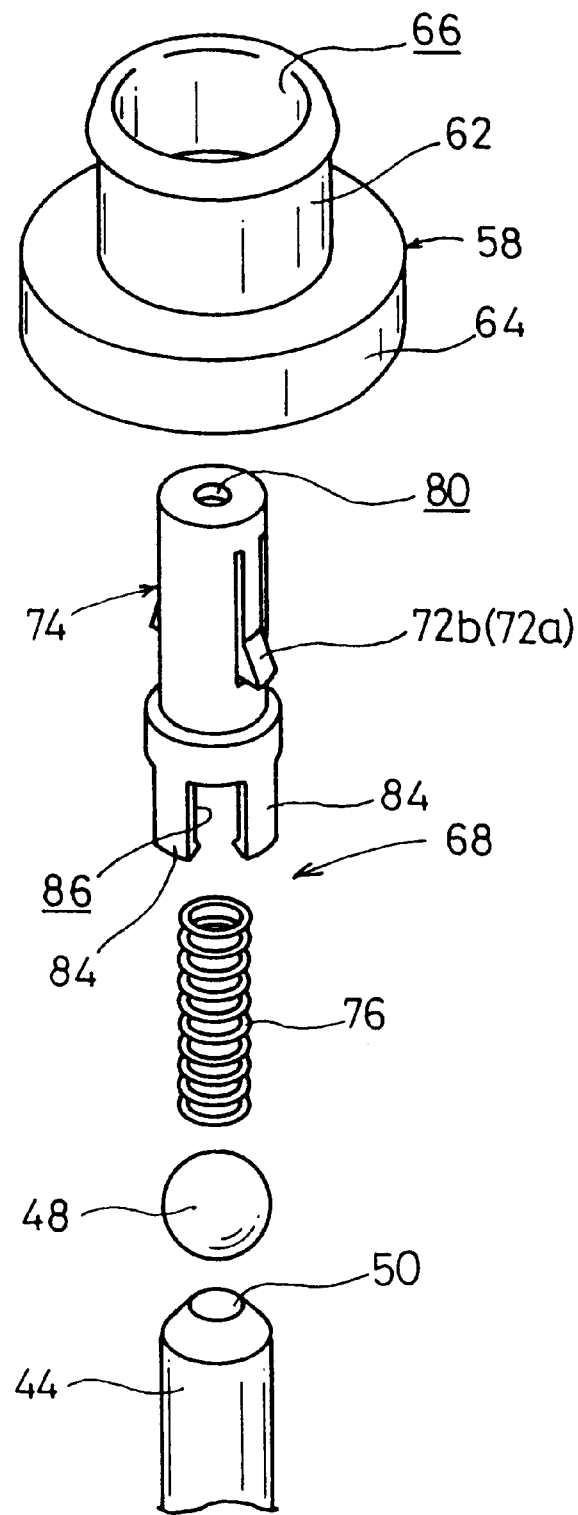

PRESSURE-REDUCING VALVE

BACKGROUND OF THE INVENTION

1. Field of the Invention

The present invention relates to a pressure-reducing valve for regulating the pressure of a fluid supplied from a primary side into a predetermined lower pressure and discharging the fluid under the regulated pressure to a secondary side.

2. Description of the Related Art

Heretofore, there have been known pressure-reducing valves for regulating the pressure of a fluid supplied from a primary source such as a fluid pressure supply into a predetermined lower pressure and discharging the fluid under the regulated pressure to a secondary device such as a fluid pressure actuator.

One conventional pressure-reducing valve is shown in FIG. 5 of the accompanying drawings. As shown in FIG. 5, the pressure-reducing valve, generally denoted by the reference numeral 1, is of the pressure relief type and basically comprises a casing 2 and a bonnet 3. The casing 2 and the bonnet 3 jointly define a space or chamber 4 which houses a diaphragm 5 supporting a relief valve mechanism 6 centrally thereon.

The relief valve mechanism 6 has a relief valve seat 9 mounted on a lower surface of the diaphragm 5 and having a relief passage 8 defined therein which is sealed by an upper end of a stem 7. The relief passage 8 comprises a vertical through hole. The upper end of the stem 7, which is of a hemispherical shape, is normally seated on a lower open end of the relief passage 8 to close the same for thereby sealing the relief passage 8.

The relief valve mechanism 6 also includes a diaphragm holder 10 which holds the diaphragm 5 between itself and the relief valve seat 9, and a nut 11 threaded over an upper end portion of the relief valve seat 9 and joining the relief valve seat 9 and the diaphragm holder 10 to each other. The bonnet 3 has a relief port 12 for releasing the secondary-side pressure of a fluid in excess of a predetermined pressure setting from the chamber 4 into the atmosphere.

The relief valve mechanism 6 operates as follows: When the secondary-side fluid pressure becomes higher than the predetermined pressure setting, the diaphragm 5 is elevated, lifting the relief valve seat 9 off the upper end of the stem 7. The fluid under the increased fluid pressure flows through the relief passage 8 into the chamber 4, and is then discharged through the relief port 12 into the atmosphere, whereupon the secondary-side fluid pressure is maintained at the predetermined pressure setting.

The relief valve mechanism 6 of the conventional pressure-reducing valve 1 is disadvantageous in that the relief valve seat 9 and the stem 7 tend to be tilted or misaligned with respect to each other because of limited dimensional accuracy of the stem 7 and limited accuracy with which the relief valve mechanism 6 is assembled. If the relief valve seat 9 and the stem 7 are tilted or misaligned with respect to each other, then the relief passage 8 is not sufficiently sealed and hence its through hole is not fully closed, allowing part of the secondary-side fluid to leak through the relief passage 8 and the relief port 12 into the atmosphere.

SUMMARY OF THE INVENTION

It is a general object of the present invention to provide a pressure-reducing valve including a relief valve mechanism whose sealing capability is increased even if a relief valve seat and a stem are tilted or misaligned with respect to each other due to limited dimensional accuracy of the stem and limited accuracy with which the relief valve mechanism is assembled.

A major object of the present invention is to provide a pressure-reducing valve including a relief valve mechanism whose sealing capability is increased by a relatively simple structure, so that the pressure-reducing valve can be manufactured relatively inexpensively.

Another object of the present invention is to provide a pressure-reducing valve including a relief valve mechanism whose parts can be assembled with ease.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 3 is an enlarged exploded perspective view of a relief valve mechanism of the pressure-reducing valve shown in FIG. 1;

DETAILED DESCRIPTION OF THE PREFERRED EMBODIMENT

Figure 1:
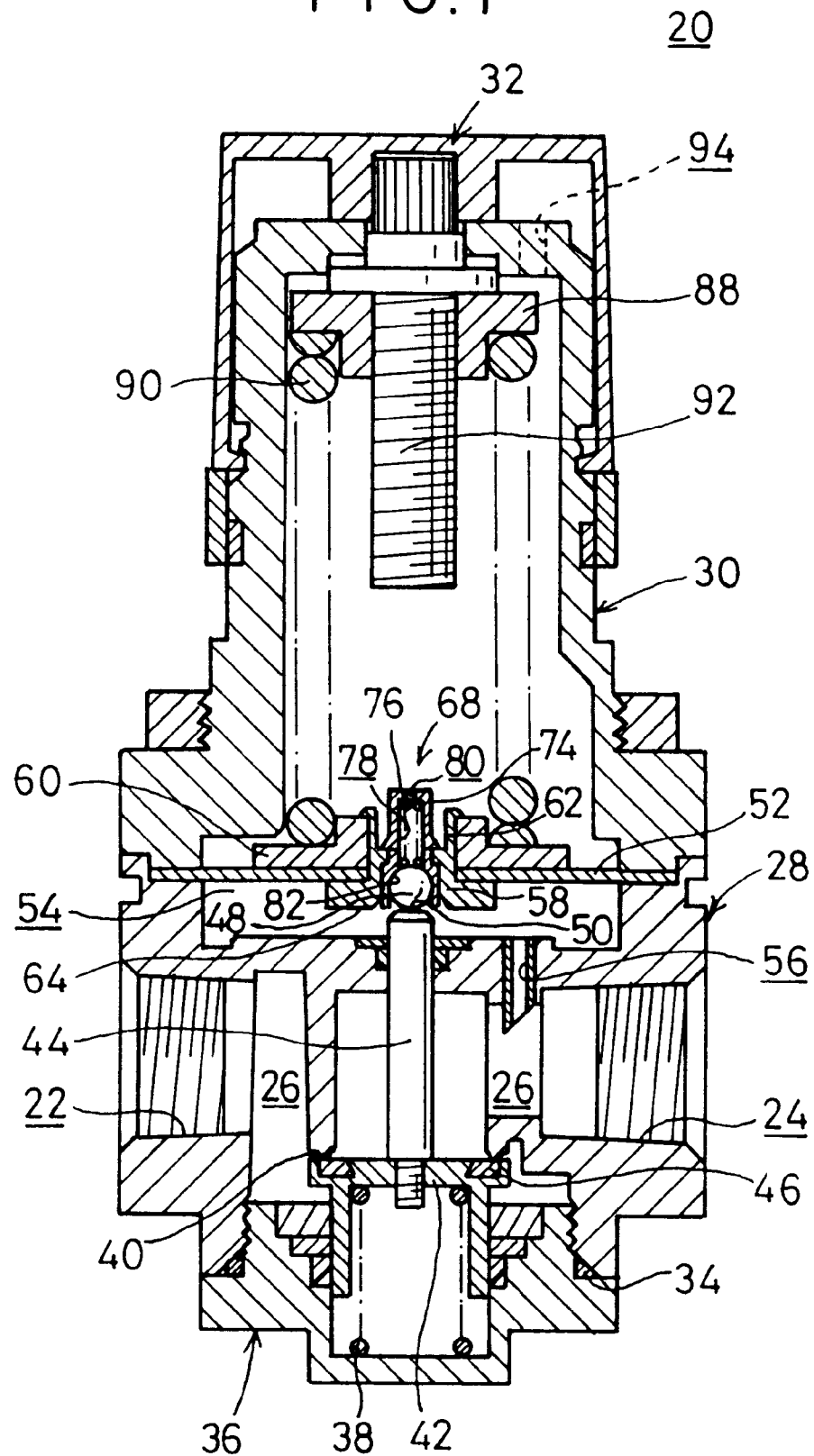
FIG. 1 is a vertical cross-sectional view of a pressure-reducing valve according to the present invention.

As shown in FIG. 1, a pressure-reducing valve 20 according to the present invention generally comprises a casing 28 having a fluid passage 26 defined therein which interconnects a primary port 22 and a secondary port 24, a bonnet 30 mounted on an upper portion of the casing 28, and a handle 32 rotatably supported on an upper portion of the bonnet 30. A valve guide 36 is hermetically fitted in a lower portion of the casing 28 with a seal 34 interposed therebetween. The casing 28 and the bonnet 30 jointly serve as a pressure-reducing valve housing.

The casing 28 houses therein a valve body 42 which can be opened, i.e., unseated off a seat (first seat) 40, against the bias of a valve spring 38 to provide fluid communication between the primary port 22 and the secondary port 24. A vertical stem 44 has a lower end joined to a central region of an upper end of the valve body 42. The valve body 42 supports a dampening resilient ring 46 fitted in an annular groove defined in the upper end of the valve body 42. The dampening resilient ring 46 can be held against the seat 40 for thereby dampening shocks produced when the valve body 42 is closed, i.e., seated on the seat 40. The stem 44 is of a cylindrical shape and has on its upper end a plane 50 (see FIG. 3) which is in point contact with the spherical surface of a ball (spherical body) 48.

A horizontal diaphragm 52 is disposed between the casing 28 and the bonnet 30. The diaphragm 52 and the casing 28 jointly define a diaphragm chamber 54 therebetween which is held in communication with the secondary port 24 through a passage 56.

A first diaphragm holder 58 and a second diaphragm holder 60, each for holding the diaphragm 52, are mounted respectively on lower and upper surfaces of the diaphragm 52. As shown in FIG. 3, the first diaphragm holder 58 comprises a tubular member 62 fitted in a central hole defined in the diaphragm 52 and projecting upwardly, and an annular flange 64 extending integrally radially outwardly from a lower end of the tubular member 62 into abutting engagement with the lower surface of the diaphragm 52. The second diaphragm holder 60 has a hole defined centrally therein through which the tubular member 62 of the first diaphragm holder 58 is inserted. The tubular member 62 is held in snapping engagement with the second diaphragm holder 60, thereby joining the first and second diaphragm holders 58, 60 to each other.

The tubular member 62 has a central cylindrical hole 66 defined therein in which a relief valve mechanism 68 is mounted.

Figure 4A:
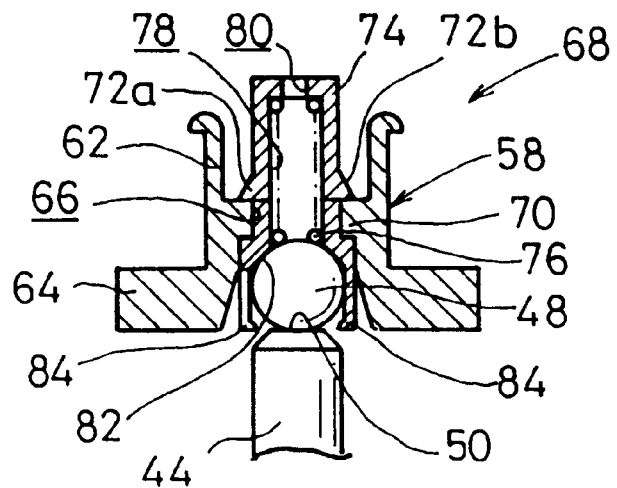
FIG. 4A is an enlarged vertical cross-sectional view of the relief valve mechanism, showing the manner in which a relief passage defined in a relief valve seat is closed.
Figure 4B:
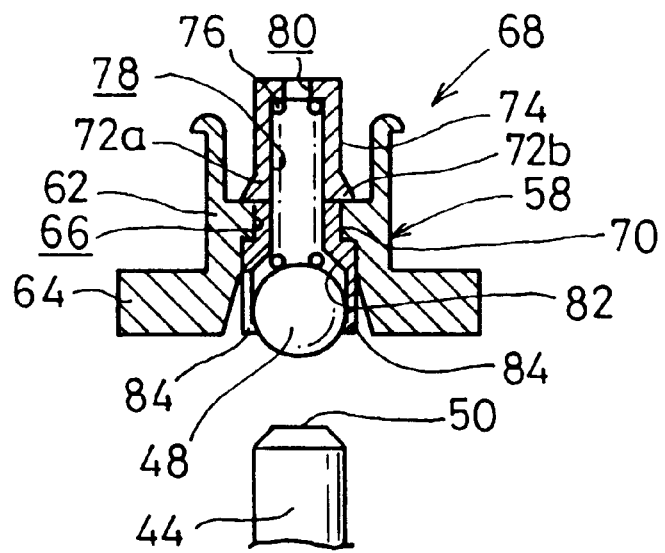
FIG. 4B is an enlarged vertical cross-sectional view of the relief valve mechanism, showing the manner in which the relief passage defined in the relief valve seat is opened.
Figure 5:
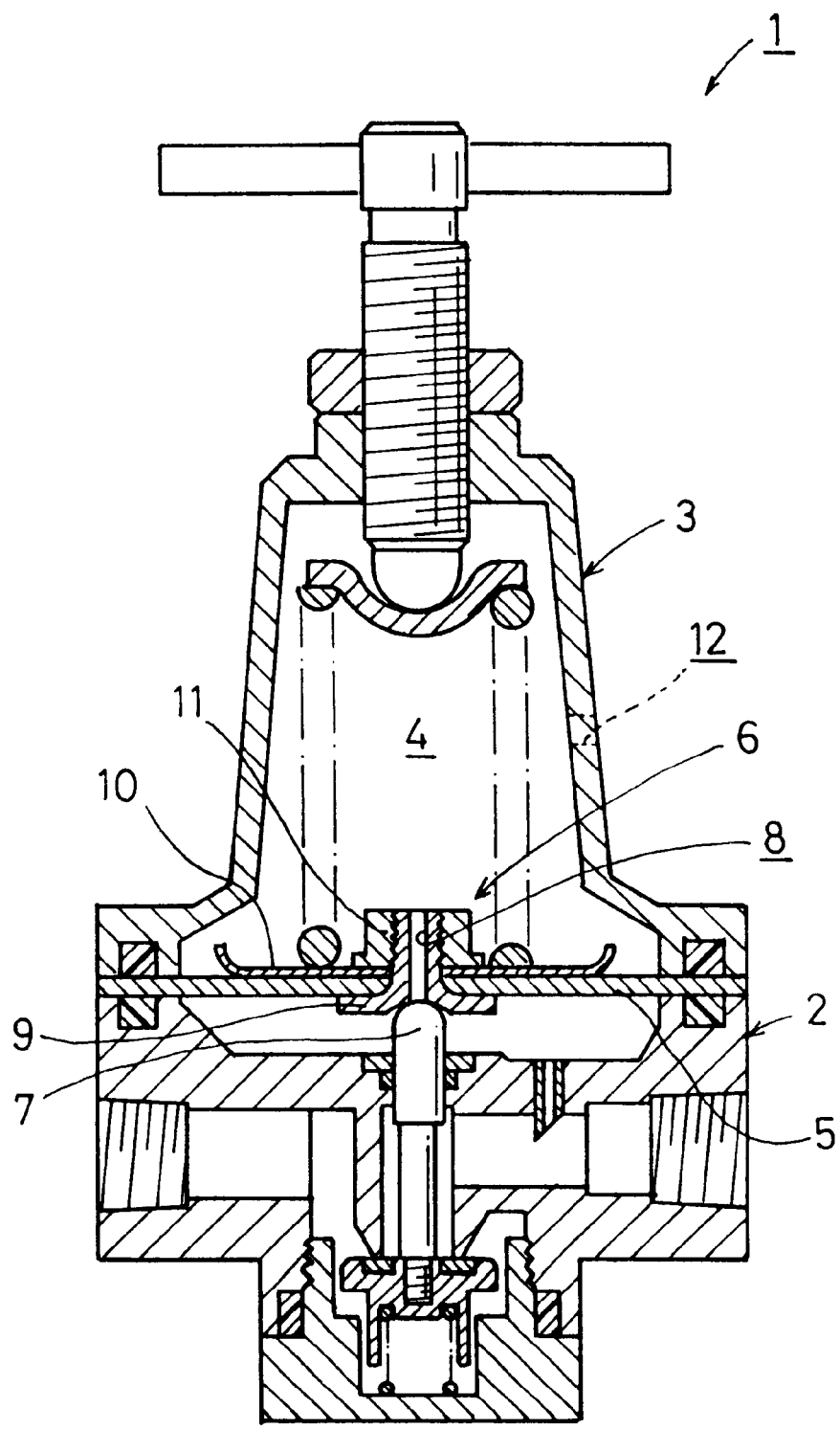
FIG. 5 is a vertical cross-sectional view of a conventional pressure-reducing valve.

As shown in FIGS. 3, 4A, and 4B, the relief valve mechanism 68 comprises a relief valve seat 74 retained in the hole 66 in the tubular member 62 and having a pair of radially outwardly projecting, cantilevered teeth 72a, 72b engaging an annular ledge 70 on an inner wall surface of the tubular member 62, a spring 76 disposed in a hole defined centrally in the relief valve seat 74, and a ball 48 disposed underneath the relief valve seat 74 and normally urged to be displaced downwarldy in the axial direction of the relief valve seat 74 under the bias of the spring 76. The hole defined centrally in the relief valve seat 74 serves as a relief passage 78 for discharging a fluid under pressure therethrough. The teeth 72a, 72b are resilient enough to return to their original position shown in FIGS. 3, 4A, and 4B when released from forces applied thereto.

The relief valve seat 74 is in the form of a bottomed cylindrical sleeve having a small hole 80 defined in an upper end thereof which is held in communication with the relief passage 78. The relief valve seat 74 has a seat (second seat) 82 on its inner wall surface which has a partly spherical surface complementary in shape to a portion of the spherical surface of the ball 48. When the ball 48 is seated on the seat 82, the ball 48 closes the relief passage 78. A plurality of downwardly extending hooks 84 are integrally formed with the lower end of the relief valve seat 74 for holding the ball 48 from being dislodged from the relief valve seat 74. The hooks 84 are radially spaced by slits 86 defined therebetween, and have an axial length greater than the diameter of the ball 48 such that the ball 48 can be displaced axially along the hooks 84. The relief valve seat 74 may be integrally formed with the first diaphragm holder 58.

A pressure regulating spring 90 is disposed in the bonnet 30. The pressure regulating spring 90 has a lower end mounted on an upper surface of the second diaphragm holder 60 and an upper end held against a pressure regulating nut 88. The diaphragm 52 is normally pressed downwardly under the bias of the pressure regulating spring 90. The pressure regulating nut 88 is threaded over a pressure regulating screw 92 fixed centrally to and extending downwardly from the handle 32 into the bonnet 30. When the handle 32 and the pressure regulating screw 92 are turned together in a selected direction, the pressure regulating nut 88 is displaced axially of the pressure regulating screw 92.

A relief port 94 is defined in an upper end of the bonnet 30 below the handle 32.

Operation of the pressure-reducing valve 20 according to the present invention will be described below.

A fluid pressure supply (not shown) is connected to the primary port 22, and a desired fluid pressure actuator, e.g., a fluid cylinder, (not shown) is connected to the secondary port 24.

Figure 2:
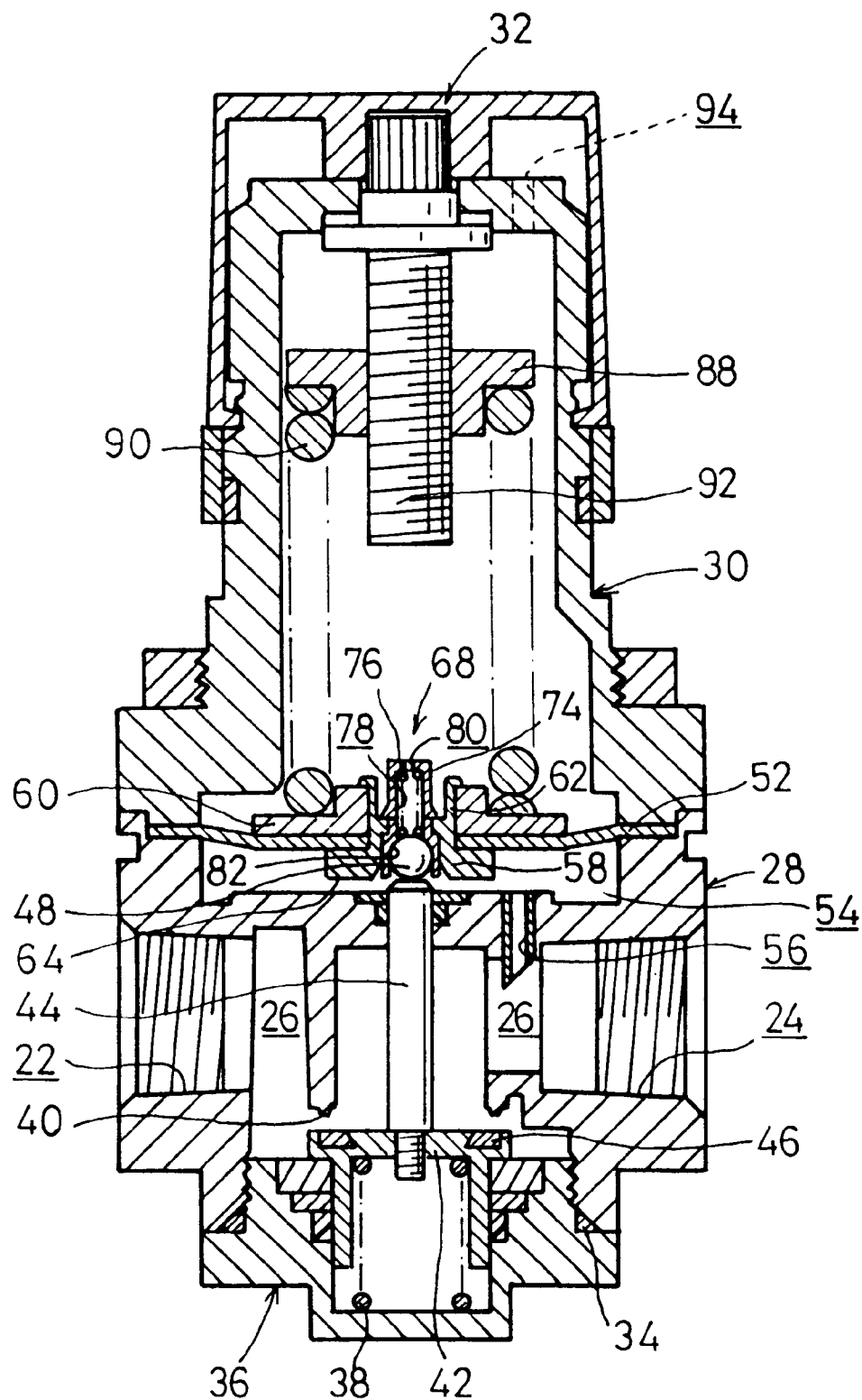
FIG. 2 is a vertical cross-sectional view of the pressure-reducing valve shown in FIG. 1, with a valve body displaced downwardly.

The handle 32 is turned in a certain direction to set up a pressure to be supplied to the fluid pressure actuator. Specifically, the handle 32 is turned to displace the pressure regulating spring 90 axially along the pressure regulating screw 92, pressing the diaphragm 52 downwardly under the bias of the pressure regulating spring 90 compressed by the pressure regulating nut 88, for thereby lowering the stem 44 and the valve body 42 together. Therefore, the valve body 42 is unseated off the seat 40 by a certain distance, thus providing fluid communication between the primary port 22 and the secondary port 24, as shown in FIG. 2.

When a secondary-side fluid pressure in the secondary port 24 is lower than a primary-side fluid pressure in the primary port 22, a fluid introduced under pressure from fluid pressure supply into the primary port 22 flows through the fluid passage 26 into the secondary port 24, from which the fluid is supplied to the fluid pressure actuator. A portion of the fluid supplied under pressure from the primary port 22 is introduced through the passage 56 into the diaphragm chamber 54, developing forces tending to press the diaphragm 52 upwardly.

The forces applied to press the diaphragm 52 upwardly counteract the biasing forces from the pressure regulating spring 90, thereby regulating the secondary-side fluid pressure that is introduced through the secondary port 24 into the fluid pressure actuator.

Until the secondary-side fluid pressure reaches the preset pressure, the relief passage 78 in the relief valve seat 74 is closed by the ball 48 as shown in FIG. 4A. Specifically, the forces tending to press the stem 44 upwardly under the bias of the valve spring 38 are applied to the stem 44, which keeps the ball 48 seated on the set 82 against the bias of the spring 76. Since the ball 48 is pressed against the seat 82 by the stem 44, the relief passage 78 is hermetically closed by the ball 48. As a result, the relief passage 78 is reliably sealed.

Insofar as the secondary-side fluid pressure is lower than the preset pressure, the fluid continuously flows into the fluid pressure actuator. As the difference between the primary-side fluid pressure and the secondary-side fluid pressure decreases, the diaphragm 52 is gradually lifted against the bias of the pressure regulating spring 90. The stem 44 and the valve body 42 are lifted in unison with the diaphragm 52 until the valve body 42 is seated on the seat 40, whereupon the secondary-side fluid pressure reaches the preset pressure. In this manner, the fluid whose pressure has been regulated to the desired preset pressure is supplied to the fluid pressure actuator.

When the secondary-side fluid pressure exceeds the preset pressure, the fluid under the increased secondary-side fluid pressure is introduced through the passage 56 into the diaphragm chamber 54, raising the diaphragm 52. When the diaphragm 52 is raised, the ball 48 is lifted off the upper end of the stem 44, and displaced downwardly away from the seat 82 under the bias of the spring 76 and the weight of the ball 48, as shown in FIG. 4B. At this time, the ball 48 is prevented from being dislodged from the relief valve seat 74 because it is locked by the hooks 84. The stem 44 is limited against upward displacement because the valve body 42 is seated on the seat 40, as shown in FIG. 1.

Therefore, as shown in FIG. 4B, the ball 48 is unseated off the seat 82, opening the relief passage 74, whereupon the fluid under the increased secondary-side fluid pressure flows through the relief passage 74 and is discharged from the relief port 94 into the atmosphere.

Since the fluid under the increased secondary-side fluid pressure is discharged through the relief valve mechanism 68 from the relief port 94 into the atmosphere, the secondary-side fluid pressure is maintained at the preset pressure level.

According to this embodiment, as described above, the relief valve seat 74 is in the form of a bottomed cylindrical sleeve, and the relief passage 78 defined in the bottomed cylindrical sleeve is opened and closed by the ball 48 which is unseated off and seated on the seat 82 of the relief valve seat 74. Since the ball 48 is interposed between the relief valve seat 74 and the stem 44, the relief passage 78 can be closed by the ball 48 seated on the seat 82 even if the relief valve seat 74 and the stem 44 are tilted or misaligned with respect to each other due to limited dimensional accuracy of the stem 44 and limited accuracy with which the relief valve mechanism 68 is assembled. As a result, the relief passage 78 is sealed with a increased sealing capability. Consequently, the pressure-reducing valve 20 can supply a fluid under pressure stably to the fluid pressure actuator connected to the secondary port 24.

Inasmuch as the sealing capability of the relief passage 78 is increased by the ball 48 which is relatively simple in structure, the pressure-reducing valve 20 can be manufactured relatively inexpensively.

Because the dimensional accuracy of the stem 44 and the accuracy with which the stem 44 is assembled are not required to be high, the stem 44 may be manufactured inexpensively, and hence the cost of the pressure-reducing valve 20 may be lowered.

Furthermore, the relief valve seat 74 can easily be fitted into the hole 66 in the first diaphragm holder 58 and detachably retained in place by the teeth 72*a*, 72*b*. Therefore, the process of assembling the relief valve mechanism 68 is relatively easy to carry out.

Although a certain preferred embodiment of the present invention has been shown and described in detail, it should be understood that various changes and modifications may be made therein without departing from the scope of the appended claims.

What is claimed is:

1. A pressure-reducing valve comprising:
    a pressure-reducing valve housing having a primary port for being supplied with a fluid under pressure and a secondary port for discharging a fluid under pressure, said pressure-reducing valve housing defining a diaphragm chamber therein and having a relief port;
    a valve body displaceably disposed in said pressure-reducing valve housing, for opening and closing a fluid passage between said primary port and said secondary port when unseated off and seated on a first seat;
    a diaphragm disposed in said diaphragm chamber for displacing said valve body under the pressure of the fluid supplied from said primary port; and
    a relief valve mechanism mounted on said diaphragm for discharging the fluid under an excessive pressure from said secondary port through said relief port;
    said relief valve mechanism including a relief valve seat shaped as a bottomed cylindrical sleeve and having a relief passage defined therein, a secondary seat disposed on an inner wall surface of said relief valve seat, and a spherical body for opening and closing said relief passage when unseated off and seated on said second seat;
    wherein said relief valve seat has a plurality of hooks for retaining said spherical body against removal from said relief valve seat.

2. A pressure-reducing valve according to claim 1, wherein said relief valve mechanism further comprises a spring disposed in said relief valve seat for normally urging said spherical body in a direction to be unseated off said second seat.

3. A pressure-reducing valve according to claim 1, further comprising a stem joined to said valve body for movement in unison therewith, said stem having an end positioned for abutment against said spherical body.

4. A pressure-reducing valve according to claim 3, wherein said stem has a plane on said end and in point contact with a spherical surface of said spherical body.

5. A pressure-reducing valve comprising:
    a pressure-reducing valve housing having a primary port for being supplied with a fluid under pressure and a secondary port for discharging a fluid under pressure, said pressure-reducing valve housing defining a diaphragm chamber therein and having a relief port;
    a valve body displaceably disposed in said pressure-reducing valve housing, for opening and closing a fluid passage between said primary port and said secondary port when unseated off and seated on a first seat;
    a diaphragm disposed in said diaphragm chamber for disposing said valve body under the pressure of the fluid supplied from said primary port;
    a relief valve mechanism mounted on said diaphragm for discharging the fluid under an excessive pressure from said secondary port through said relief port;
    said relief valve mechanism including a relief valve seat shaped as a bottomed cylindrical sleeve and having a relief passage defined therein, a second seat disposed on an inner wall surface of said relief valve seat, and a spherical body for opening and closing said relief passage when unseated off and seated on said second seat; and
    a first diaphragm holder and a second diaphragm holder which are disposed in said pressure-reducing valve housing, wherein said diaphragm is sandwiched between said first diaphragm holder held against a lower surface of the diaphragm and said second diaphragm holder held against an upper surface of the diaphragm, and wherein said first diaphragm holder has a cylindrical holder defined therein, and said relief valve seat has a pair of resilient teeth and is detachably mounted in said cylindrical hole by said teeth.

6. A pressure-reducing valve according to claim 3, further comprising a resilient member mounted on said valve body for dampening shocks when the valve body is seated on said first seat.

7. A pressure-reducing valve according to claim 1, wherein said second seat has a partly spherical surface complementary in shape to a portion of said spherical body.

8. A pressure-reducing valve according to claim 5, wherein the relief valve seat has a plurality of hooks for retaining the spherical body against removal from the relief valve seat.

9. A pressure-reducing valve according to claim 5, wherein the relief valve mechanism also includes a spring disposed in the relief valve seat for normally urging the spherical body in a direction to be unseated from the second seat.

10. A pressure-reducing valve according to claim 5, further comprising a stem joined to the valve body for movement in unison therewith, said stem having an end positioned for abutment against the spherical body.

11. A pressure-reducing valve according to claim 10, wherein the stem has a plane on the end and in point contact with a spherical surface of the spherical body.

12. A pressure-reducing valve according to claim 2, further comprising a first diaphragm holder and a second diaphragm holder which are disposed in a pressure-reducing vlave housing, wherein said diaphragm is sandwiched between the first diaphragm holder held against a lower surface of the diaphragm and the second diaphragm holder held against an upper surface of the diaphragm, wherein the first diaphragm holder has a cylindrical hole defined therein, and wherein the relief valve seat is mounted in the cylindrical hole.

13. A pressure-reducing valve according to claim 12, wherein the relief valve seat has a pair of resilient teeth and is detachably mounted in the cylindrical hole by the teeth.

14. A pressure-reducing valve according to claim 10, further comprising a resilient member mounted on the valve body for dampening shocks when the valve body is seated on the first seat.

15. A pressure-reducing valve according to claim 5, wherein the second seat has a partly spherical surface complementary in shape to a portion of the spherical body.

* * * * *